United States Patent [19]

Hoogeveen

[11] 4,347,606
[45] Aug. 31, 1982

[54] METHOD OF FRAME SYNCHRONIZATION OF A DIGITAL TDM COMMUNICATION SYSTEM AND ARRANGEMENT FOR PERFORMING THE METHOD

[75] Inventor: Jacobus Hoogeveen, Hilversum, Netherlands

[73] Assignee: U.S. Philips Corporation, New York, N.Y.

[21] Appl. No.: 141,544

[22] Filed: Apr. 18, 1980

[30] Foreign Application Priority Data

Apr. 26, 1979 [NL] Netherlands ............... 7903284

[51] Int. Cl.³ .................................. H04J 3/06
[52] U.S. Cl. .......................... 370/105; 375/116
[58] Field of Search ............... 375/114, 116; 370/100, 370/105, 106

[56] References Cited

U.S. PATENT DOCUMENTS 4,213,011 7/1980 Hoelzl et al. .................. 370/106
4,230,911 10/1980 Fellinger et al. .............. 370/106

Primary Examiner—Marc E. Bookbinder
Attorney, Agent, or Firm—Thomas A. Briody; William J. Streeter; Edward W. Goodman

[57] ABSTRACT

The invention relates to a method of frame synchronization of a digital time-division multiplex communication system and to an arrangement for performing the method.

During the search for a synchronization pattern of M bits in frames, each consisting of N time slots, a shift register of N×M bits is usually used. The method according to the invention has for its object to reduce the number of bit storage capacity required. The method operates as follows. At the start of the synchronization process the first bit of the synchronization pattern is expected. If this expectation comes true, the second bit of the synchronization pattern is expected in that time slot in the immediately subsequent frame etc. If the expectation does not come true then the (partially) received pattern is no synchronization pattern and the procedure is performed again in that time slot. The method is based on the recognition that it is not necessary to store the partially received synchronization pattern in a store, but that it is sufficient to store the numerical order of the bit of the synchronization pattern expected in the time slot of the next frame. Consequently, a storage capacity of N×entire $\log_2 M$ is sufficient.

The method can be performed with a microprocessor or with "wild" logic circuits.

4 Claims, 4 Drawing Figures

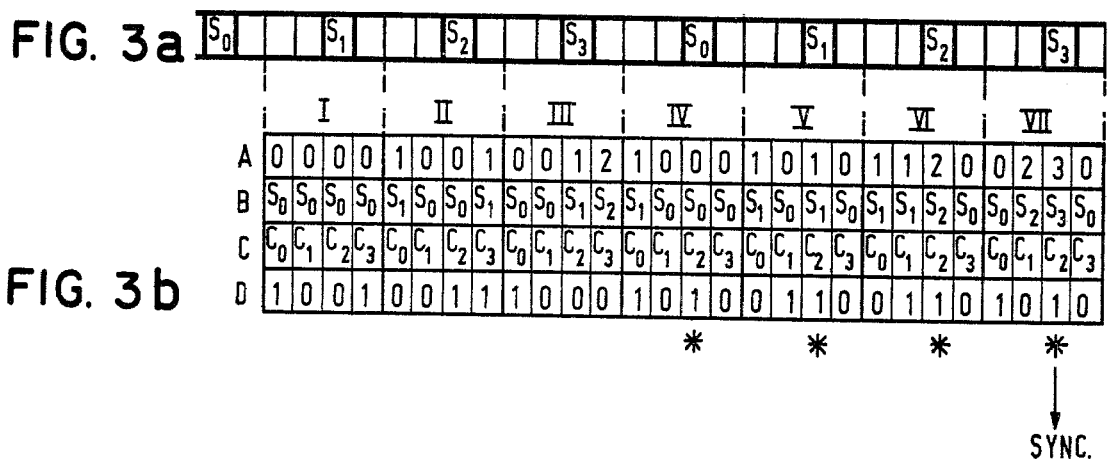
FIG. 3a
FIG. 3b
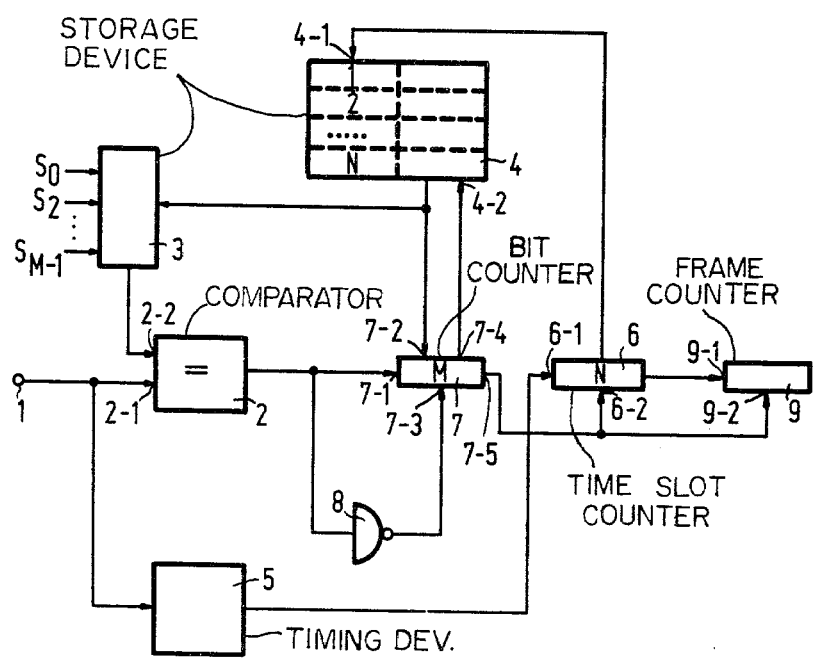
FIG. 4

METHOD OF FRAME SYNCHRONIZATION OF A DIGITAL TDM COMMUNICATION SYSTEM AND ARRANGEMENT FOR PERFORMING THE METHOD

BACKGROUND OF THE INVENTION

The invention relates to a method of frame synchronisation of a digital time-division multiplex (TDM) communication system wherein a frame comprises a sequence of N consecutive time slots at least one slot of which comprises at least one synchronisation bit and wherein M frames comprise one complete synchronisation pattern.

The invention further relates to an arrangement for performing the method.

Such a method or arrangement is used inter alia in "bit-interleaved T (time) D (division) M (Multiplex)" communication systems. With such systems data are transmitted in frames. A frame comprises a plurality of time slots N, each comprising a plurality of bits. Frames and time slots are transmitted serially. One of the time slots is utilized to transmit a synchronisation pattern therein. The time slot used for this purpose is often one bit long. At the receiving end each time slot must be identified in order to synchronize, for example, a demultiplexing arrangement or to supervise the existing synchronisation. A shift register having a capacity of N×M bits is usually used during the search for a synchronisation pattern of M-bits in frames composed of N time slots.

SUMMARY OF THE INVENTION

It is an object of the invention to provide a method which effects frame synchronisation in a simple manner. This method is characterized in that it comprises the following steps:

first step, comparing each bit of a sequence of N consecutive time slots with a bit of the synchronisation pattern the numerical order of which is equal to the immediately preceding, consecutive number of times bit—agreement was detected in that bit position;

second step, determining for each bit position whether there is bit agreement or not;

third step, recording for each bit position that consecutive bit agreement was ascertained;

fourth step, detecting of the number of M consecutive, adjoining times bit-agreement was found in one bit position;

fifth step, designating the bit in the bit position determined in the preceding steo, as synchronisation bit.

A further object of the invention is to provide an arrangement for performing the method which results, particularly with long synchronisation patterns, in a considerable saving in storage capacity.

The arrangement according to the invention is characterized in that the arrangement comprises a comparator and a first storage device for storing the bits, that the comparator comprises a first input terminal for receiving a digital input signal and a second input terminal connected to an output of the first storage device, that the arrangement further comprises a time slot counter and an addressable second storage device having a capacity of at least N× $\log_2$ M bits and the time slot counter has an input coupled to the first input terminal and an output connected to a first input of the second storage device, a counter position of the time slot counter being one address of the second storage device, and in that an output of the second storage device is coupled to an input of the first storage device and to the output of the comparator.

The arrangement according to the invention has the advantage that the synchronisation of a system wherein a synchronisation pattern of M bits in frames consisting of N time slots is used, requires only a store having a capacity of N× ENTIRE $\log_2$ M bits. (ENTIRE $\log_2$ M is the integer which is greater than or equal to $\log_2$ M;

DESCRIPTION OF THE DRAWINGS

The invention and its advantages will be further explained with reference to some figures. Herein:

FIG. 3 shows an example of a frame synchronizing cycle according to the invention;

FIG. 4 shows a block circuit diagram of an arrangement for performing the method according to the invention.

DESCRIPTION OF THE PREFERRED EMBODIMENT

Figure 1:
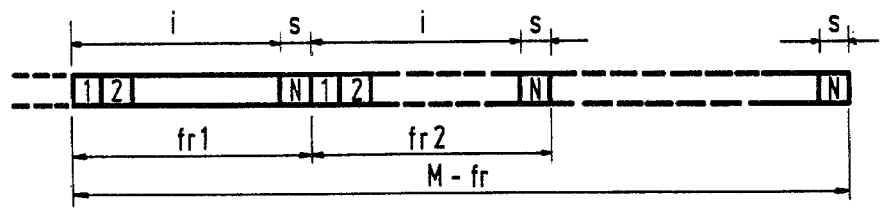
FIG. 1 is a schematic representation of a frame structure of a communication system.

FIG. 1 shows schematically how a sequence of M consecutive frames of a digital TDM communiction system is subdivided. Each of the frames 1, 2 etc. comprises, for example, N time slots and each time slot accommodates at least one bit. One of the time slots serves as synchronisation slot. Consecutive time slots located in the same relative position in a frame form a data channel. It often happens that the time slot which is intended for synchronisation purposes can contain only one bit even if the other slots contain several bits (for example a 8-bit PCM word). In FIG. 1 the synchronisation slot s is placed, by way of example, in position N in the frame and in the further description it is assumed that one bit is present in each slot and that, consequently, a sequence of M frames contains one synchronisation pattern consisting of M bits.

At the receiving end each time slot in a frame must be identified. In order to realize this identification it has already been proposed to apply the received data to a shift register having a length of N×M bits, this shift register having been provided with M taps which are N bits apart. These taps are connected to a coincidence circuit to which also the synchronization pattern is applied. After the data bits have been shifted one position in the shift register, the M data bits then present in the region of the M taps are compared with the M bits of the synchronisation pattern. When there is coincidence, there is synchronisation and the demultiplexer is, for example, adjusted to the position which corresponds with the synchronisation channel. This method has the drawback that it requires a relatively large storage capacity.

In the method of frame synchronisation of a digital time-division multiplex communication system, it is assumed that the data bit which is received first is the first synchronisation bit. If this assumption is correct, the second synchronisation bit is expected in the subsequent frame. Should the received bit not agree with the expected synchronisation bit, the pattern received so far was apparently not a synchronisation pattern. A new search action is then started. This method has the advantage that it is not necessary to preserve the (partially) received synchronisation pattern but that it is sufficient to preserve the numerical order of the synchronisation bit expected in the relevant slot.

Figure 2:
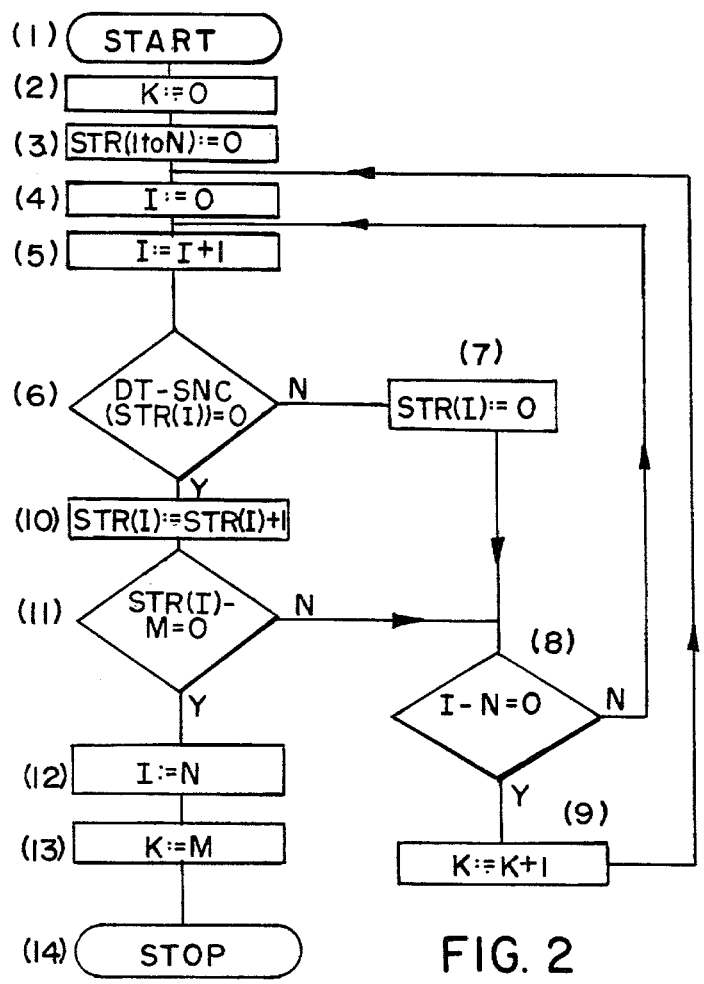
FIG. 2 is a flow diagram of an embodiment of the method according to the invention.

An embodiment of the method of frame synchronisation is illustrated in the flow diagram for frame synchronisation as shown in FIG. 2.

The following explanations refer to the designation in the geometric figures, which explain the functions and the states of the method of frame synchronisation in order of time. It should be noted that such a chronological sequence of functions and associated states of the method of frame synchronisation can be realized in universal, sequentially programmable logic circuits, such as commercially available micro-processors with associated stores and peripheral equipment.

| Designation | | Description |
|---|---|---|
| (1) | START | Start |
| (2) | K:=O | The number K which the instantaneous frame has (K=1, 2, 3, ..., M) is allotted a value O. |
| (3) | STR (1 to N):=O | A set of variables STR (N), representing the number of times bit agreement has been found in immediately preceding consecutive frames in the particular time slot, is set to O. |
| (4) | I:=O | The number I which the instantaneous time slot has (I=1, 2, 3, ..., N) is allotted a value O. |
| (5) | I:=I+1 | The time slot number I is incremented by 1. |
| (6) | DT-SNC (STR(I))=O? | The data bit received is compared with a bit of the synchronization pattern. The numerical order of the particular synchronization bit SNC is equal to STR(I). If there is no bit agreement, step (7) is performed. If there is bit agreement, step (10) is performed. |
| (7) | STR(I):=O | There being no bit agreement in time slot I, STR (I) is thereupon allotted the value O. |
| (8) | I−N=O? | The time slot number is compared to the number N of time slots in a frame K. If I does not equal N, step (5) is performed. If I equals N, step (9) is performed. |
| (9) | K:=K+1 | The frame number K is incremented by 1 and then step (4) is performed. |
| (10) | STR(I)=STR(I)+1 | There being bit agreement in time slot I, STR(I) is thereupon incremented by 1. |
| (11) | STR(I)−M=O? | In time slot I, STR(I) is compared to the number M of synchronization bits in the synchronization pattern. If STR(I) does not equal M, step (8) is performed. If STR(I) equals M, step (12) is performed. |
| (12) | I:=N | The time slot number I is allotted the value N. |
| (13) | K:=M | The frame number K is allotted the value M. |
| (14) | STOP | Stop. |

The method will be further explained with reference to an example of frame synchronisation, shown in FIG. 3. FIG. 3a shows the construction of a digital signal consisting of a number of consecutive frames, each comprising four time slots. One time slot of each frame contains a synchronisation bit. The synchronisation pattern consists of four bits, namely $S_0$, $S_1$, $S_2$ and $S_3$. FIG. 3b shows a number of frames (I, II, ... VII) of the received data signal which show lack of synchronisation with the correct signal shown in FIG. 3a. Line A shows the number of times there was agreement between the data bit and the synchronisation bit in the present time slot in the frames immediately preceding the present frame. Frame I shows the starting situation, namely 0 times bit agreement in all slots. Line B shows the synchronisation bit with a numerical order determined by the number of times there was bit agreement. Frame I shows the starting situation ($S_0$ in each slot). Line C indicates that the relevant synchronisation bit is compared with the instantaneous data bit. Line D shows the result of that comparison in numerical form, a zero indicating there was no agreement and an 1 indicating agreement. The choice whether there is bit agreement or not is arbitrary for those time slots (of FIG. 3b) which do not agree with a synchronisation bit in the synchronisation pattern shown in FIG. 3a. For those time slots (of FIG. 3b) which "coincide" with the synchronisation bits in FIG. 3a the decision is apparent from the comparison shown, for the other time slots, an arbitrary choice has been made for the bit value of $S_i$ and $C_i$ (i=0, 1, 2, 3) resulting in a comparison result indicated at line D. In the shown example $C_2$ in frame I, $S_0$ is compared with $S_1$, resulting in a zero. In frame II the instantaneous data bit is again compared in each time slot with the selected synchronisation bit. In the first and the second slot there is no bit agreement, so that $C_0=C_1=0$; in the third slot there is agreement ($C_2=1$); however, in the corresponding slot in frame I there was no agreement, so that the starting situation for the next frame (shown in line A, frame III) becomes: one time agreement. In the fourth slot of frame II, as well as in the third slot, there is agreement. However, in the corresponding preceding slot (slot 4, frame I) there was also agreement. So the starting situation for the next frame (shown in line A, frame III) is: two times agreement. Thereafter, the bits of frame III are compared etc. From the shown example it appears that in the frames IV, V, VI and VII consecutive agreement occurs in the time slot $C_2$. Consequently, time slot $C_2$ in the fourth consecutive frame (frame VII) is defined as the slot comprising the synchronisation bit.

FIG. 4 shows an arrangement for performing the method of the invention. The data applied to an input terminal 1 are applied to a first input terminal 2-1 of a comparator 2 by means of which these data are compared bit-wise with a synchronisation bit applied by a first storage device 3 to a second input terminal 2-2 of comparator 2. The first storage device 3 contains the M bits (M≧2) of a synchronisation pattern. The numerical order of the synchronisation bit applied to comparator 2 is determined by a number which is stored in a second storage device 4. This number is addressed and determined in the following manner. The input terminal 1 is also connected to a timing device 5. Timing device 5 extracts clock information from the received data signal. At the transition to the next time slot, timing device 5 applies a counting pulse to an input 6-1 of a time slot counter 6. The counting position of time slot counter 6 identifies the next time slot which wil be processed by comparator 2. The counting position of time slot counter 6 further addresses the next storage position in the second storage device 4. To that end an output of the time slot counter 6 is connected to an input 4-1 of the second storage device 4. Assuming a frame to consist of N time slots, time slot counter 6 may, for example, be a modulo-N counter and the addressable, second storage device 4 has a capacity of at least N storage positions. The N storage positions can accommodate N words, such a word indicating the numercal order the synchronisation bit, which is to be applied to comparator 2 by the first storage device 3, must have. For that purpose an output of the second storage device 4 is connected to an input of the first storage device 3. The output of the second storage device 4 is further connected to a second input 7-2 of a bit counter 7. The word received from the second storage device 4 is taken over by the bit counter 7. A first input 7-1 of the bit counter 7 is connected to an output of the comparator 2 for increasing the counting position of bit counter 7 by one, when bit agreement is detected. The output of comparator 2 is connected via a gate 8 to a third input 7-3 of bit counter 7 for resetting the bit counter 7 to zero when there is lack of agreement. The result of this operation, that is to say the counting position of bit counter 7, is stored in the second storage device 4. To that end, an output 7-4 of the bit counter 7 is connected to the second input 4-2 of the second storage device 4. An output 7-5 of bit counter 7 is connected to a resetting input 6-2 and 9-2, respectively, of the time slot counter 6 and to the frame counter 9 for setting time slot counter 6 to N and frame counter 9 to M as soon as the bit counter 7 reaches the value M: synchronisation has been achieved.

The number of times that agreement is ascertained in immediately preceding consecutive frames is stored in the second storage device 4. This number of times there is agreement cannot be more than M. Storing the number M requires a number of bits equal to the integer which is greater than or equal to $\log_2 M$. This implies that, particularly with longer synchronisation patterns, a considerably smaller storage capacity is sufficient.

When frame synchronisation has been attained, the same method and arrangement for performing the method can be used to supervise the synchronisation. In that case it is sufficient to check only in the time slot which contains the synchronisation bits, whether there is bit agreement as the synchronisation time slot can be identified at synchronisation. After the M bits of the synchronisation pattern have been received the counting position M of the bit counter and the frame counter must show the value M, if synchronisation is correct. When these values differ the synchronisation is disturbed, (neglecting transmission and detection errors).

The bit counter 7 is not an essential component. Namely, if the addressable second storage device is arranged so that "direct" addition can be effected in the store, then the bit counter 7 can be omitted and the output of the comparator 2 will be connected to the second input 4-2 of the second storage device 4, either direct or via timing device 5.

What is claimed is:
1. A method of frame synchronization of a digital time-division multiplex (TDM) communication system wherein a frame includes a sequence of N consecutive time slots, each slot containing at least one bit, at least one slot of which comprising at at least one synchronization bit, and wherein M such frames (M>2) comprise a complete synchronization pattern having a numerical order of 0 to M−1, characterized in that the method comprises the following steps:
 first step, comparing each incoming bit of a sequence of N consecutive time slots with a bit of the synchronisation pattern, the numerical order of said synchronization pattern bit being initially 0 and subsequently equal to the number of times bit-agreement was detected in respective time slot positions in immediately preceding, consecutive frames;
 second step, determining, for each time slot position, whether there is agreement or not;
 third step, recording for each time slot position the number of times there was bit agreements in the immediately preceding consecutive frames and in the present frame when bit agreement is detected in the present frame;
 fourth step, repeating said first, second and third steps until a number M of consecutive, frame bit-agreements is detected in one time slot position;
 fifth step, designating the bit in the one time slot position, associated with said M bit-agreements as determined in the preceding step, as the synchronization bit.

2. An arrangement for performing frame synchronisation of a digital time-division multiplex communication system wherein a frame includes a sequence of N consecutive time slots, each slot containing at least one bit, at least one slot of which comprises at least one synchronization bit, and wherein M such frames comprise a complete synchronization pattern, characterized in that the arrangement comprises a comparator, a first storage device for storing the bits of the synchronization pattern, the comparator comprising a first input terminal for receiving a digital input signal and a second input terminal, connected to an output of the first storage device, a time slot counter and an addressable second storage device having a capacity of at least $N \times \log_2 M$ bits, an input of the time slot counter being coupled to the first input terminal, a setting input of said counter coupled to an output of said second storage device and an output of the time slot counter being coupled to a first input of the second storage device, a counting position of the time slot counter being one address of the second storage device, an output of the second storage device being coupled to an input of the first storage device and the output of the comparator being coupled to a second input of the second storage device.

3. An arrangement as claimed in claim 2, characterized in that the arrangement further comprises a bit counter having first and second inputs and outputs, the first input being coupled to the output of the comparator, the second input being connected to the output of the addressable second storage device, the first output being connected to the second input of the addressable second storage device and the second output being connected to said setting input.

4. An arrangement further as claimed in claim 2 or 3, characterized in that the arrangement comprises a frame counter having an input, which input is coupled to said setting input of the time slot counter.

* * * * *